US00RE35746E

United States Patent [19]

Lake

[11] E Patent Number: Re. 35,746

[45] Reissued Date of Patent: Mar. 17, 1998

[54] BATTERY PACKAGE AND METHOD USING FLEXIBLE POLYMER FILMS HAVING A DEPOSITED LAYER OF AN INORGANIC MATERIAL

[75] Inventor: Rickie C. Lake, Eagle, Id.

[73] Assignee: Micron Technology, Inc., Boise, Id.

[21] Appl. No.: 675,729

[22] Filed: Jul. 3, 1996

Related U.S. Patent Documents

Reissue of:

[64] Patent No.: 5,326,652
Issued: Jul. 5, 1994
Appl. No.: 8,529
Filed: Jan. 25, 1993

[51] Int. Cl.[6] ..... H01M 2/04; H01M 2/08

[52] U.S. Cl. ..... 429/127; 429/162; 429/177; 429/185

[58] Field of Search ..... 429/127, 162, 429/177, 185, 167, 163

[56] References Cited

U.S. PATENT DOCUMENTS

| | | | |
|---|---|---|---|
| 3,709,459 | 1/1973 | Bushrod | 249/134 |
| 4,262,631 | 4/1981 | Kubacki | 118/723 |
| 4,605,813 | 8/1986 | Takeuchi et al. | 136/244 |
| 4,608,323 | 8/1986 | Zaborney | 429/167 |
| 4,612,409 | 9/1986 | Hamakawa et al. | 136/244 |
| 4,615,959 | 10/1986 | Hayashi et al. . | |
| 4,733,942 | 3/1988 | Hamakawa et al. | 136/244 |
| 4,981,672 | 1/1991 | DeNeufville et al. | 423/464 |
| 5,162,172 | 11/1992 | Kaun | 429/155 |
| 5,227,264 | 7/1993 | Duval et al. | 429/192 |

FOREIGN PATENT DOCUMENTS

| | | |
|---|---|---|
| 2-21557 | 1/1990 | Japan . |
| 4-106865 | 4/1992 | Japan . |

*Primary Examiner*—John S. Maples
*Attorney, Agent, or Firm*—Trask, Britt & Rossa

[57] ABSTRACT

A battery package for a thin battery includes a flexible base film that covers and encloses the battery and a flexible layer of an inorganic material such as silicon nitride, aluminum nitride or aluminum oxide deposited on the base film to encapsulate and seal the battery. The base film is formed of a flexible polymer material such as polyester that may be attached to the battery using a heat activated adhesive. The layer of inorganic material is deposited on the base film utilizing a low temperature CVD deposition process either before or after the base film is attached to the battery.

40 Claims, 2 Drawing Sheets

BATTERY PACKAGE AND METHOD USING FLEXIBLE POLYMER FILMS HAVING A DEPOSITED LAYER OF AN INORGANIC MATERIAL

Matter enclosed in heavy brackets [ ] appears in the original patent but forms no part of this reissue specification; matter printed in italics indicates the additions made by reissue.

FIELD OF THE INVENTION

This invention relates generally to batteries and more particularly to a flexible battery package formed of a flexible polymer film sealed with a flexible layer of a deposited inorganic material such as silicon nitride.

BACKGROUND OF THE INVENTION

Advancements in semiconductor technology have led to the production of large scale integrated circuits which have brought about a revolution in the electronics industry. Microelectronic components are now widely used in a production of a variety of electronic devices (i.e. computer, calculators, watches). Development of such miniature electronic instruments has demanded the evolution of batteries as miniature power supplies. This new generation of batteries must produce higher energy per unit volume and superior discharge characteristics as compared to traditional batteries.

Miniature batteries based on aqueous, non-aqueous and solid electrolytes are manufactured as power sources for microelectronic and portable electronic equipment. As an example, thin solid state batteries are often constructed with an anode formed of solid lithium and a cathode constructed of a solid electrolyte. The lithium is typically in the form of a thin lithium foil. Other types of metal foil are also utilized to form the anode (i.e. nickel). This type of battery has a long shelf life and operates efficiently over a wide temperature range.

An important design consideration in the manufacture of thin batteries is the packaging arrangement for sealing the active components of the battery. Thin batteries are typically assembled in a controlled environment and then sealed with some type of a case structure. Typically the cases are formed of a welded metal enclosure. A case may also be constructed as a foil pouch.

In general, the case must hermetically seal the active components of the battery from corrosive agents, such as moisture and oxygen, in the operating environment of the battery. Lithium foil in particular, and most metal foils commonly used in thin batteries in general, cannot survive more than a few hours or days in a high permeability or wet environment. For this reason, metal cases for batteries are typically formed using glass-to-metal or ceramic-to-metal seals. Foil pouch cases are typically assembled using sealed metal/polymer laminates.

These types of battery packaging arrangements are relatively expensive bemuse the materials are expensive and the manufacturing requirements for forming the packages are complicated. In addition, battery cases or packages constructed with metal or metal/polymer laminates my be heavy and exhibit high electrical conductivity. A battery with a high metal mass and high conductivity may produce interference when utilized in radio frequency transmitter or receiver devices. Moreover, metal battery packages cannot be constructed with curved or irregular surface geometries. Finally, these types of metal battery packages may not satisfy the permeability and chemical resistance requirements of some demanding applications (i.e. high temperature and corrosive environments).

There is then, a need in the art for a thin battery packaging arrangement that overcomes the aforementioned limitations of prior art battery packaging arrangements. Accordingly, it is an object of the present invention to provide a battery package for thin batteries that is inexpensive and easy to manufacture yet offers a high level of protection for the internal components of the battery. It is a further object of the present invention to provide a battery package for thin batteries that is light weight and flexible and which is formed of a nonconductive highly impermeable material It is yet another object of the present invention to provide a battery package for thin batteries that may be formed with a curved surface geometry. It is a further object of the present invention to provide a novel method for manufacturing a battery package in which a flexible base film is constructed to cover the battery and a flexible layer of an inorganic material such as silicon nitride, aluminum nitride, or aluminum oxide is deposited on the base film to encapsulate and seal the assembly.

SUMMARY OF THE INVENTION

In accordance with the present invention, a flexible battery package for thin batteries is provided. The battery package includes a flexible base film that covers the battery and a flexible layer of an inorganic material such as silicon nitride, aluminum nitride, or aluminum oxide is preferably formed of a flexible light weight polymer material, such as polyester.

For assembling the battery package, one or more sheets of the base film maybe formed as a structure that encloses the battery and leads. A heat activated adhesive may be utilized to attach the sheets of base film to the battery. The layer of inorganic material (i.e. silicon nitride, aluminum nitride, aluminum oxide) is then deposited on the edges and over the external surface of the structure, after attachment to the base film to the battery, using a low temperature (i.e. less than 150° C.) chemical vapor deposition process. The flexible layer of inorganic material encapsulates and hermetically seals the package. Alternately, the layer of inorganic material may be deposited on the base material in advance to form a composite structure which can then be shaped to encapsulate and seal the battery.

Such a flexible composite package (base film/inorganic material) is impervious to gas (i.e. oxygen, nitrogen, hydrogen, carbon dioxide, etc.) and water vapor transmission. Moreover, such a flexible package may be shaped to conform to an irregular or curved surface. Further, such a flexible composite package is light weight, low cost and can be formed with an extremely thin surface profile.

Other objects, advantages and capabilities of the present invention will become more apparent as the description proceeds.

DETAILED DESCRIPTION OF THE PREFERRED EMBODIMENT

Figure 1:
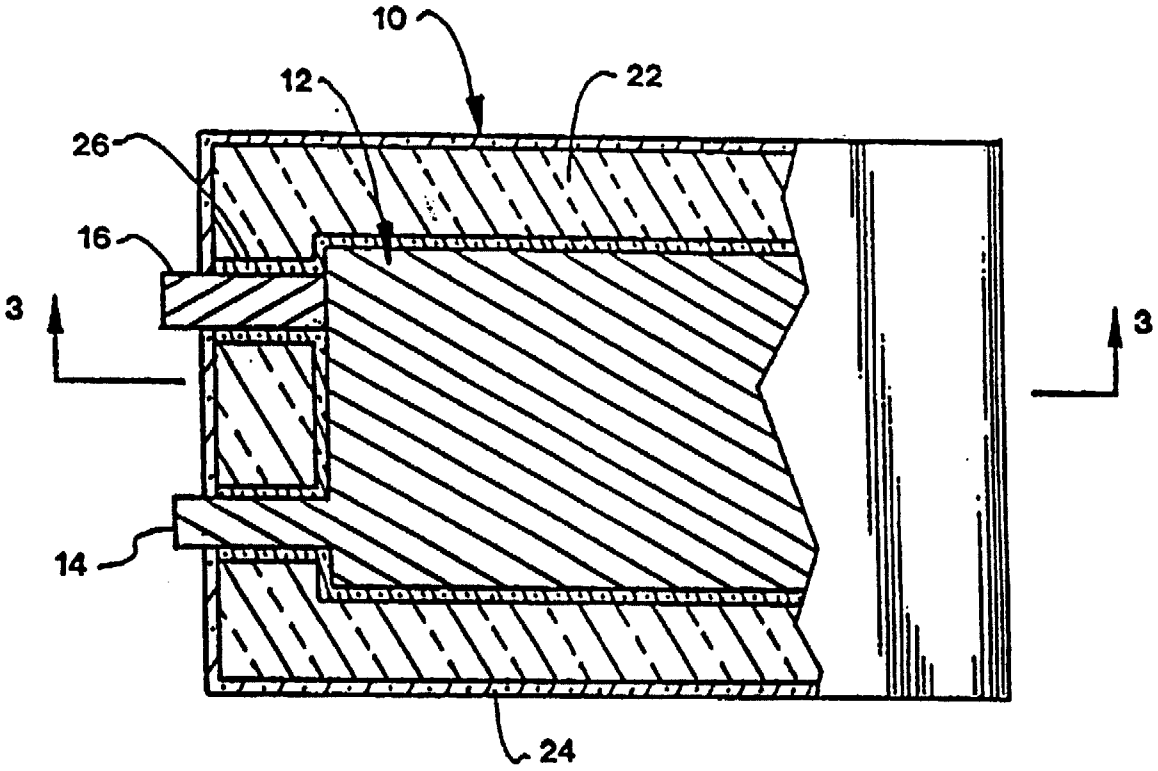
FIG. 1 is a plan view, partially cut away and in cross section of battery package for a thin battery constructed in accordance with the invention.
Figure 2:
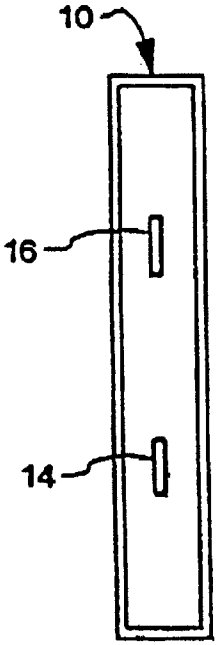
FIG. 2 is an end view of FIG. 1.
Figure 3:
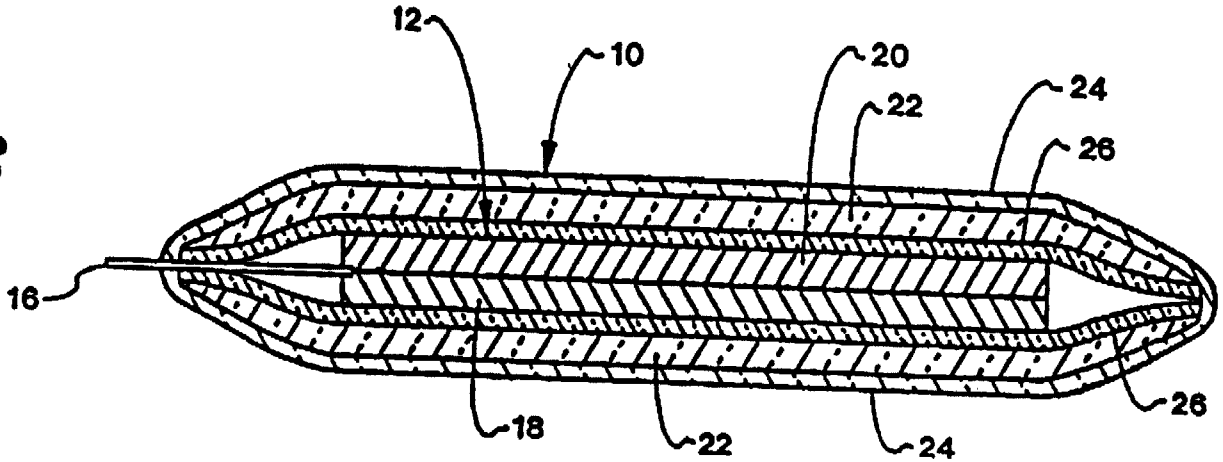
FIG. 3 is a cross sectional view taken along section line 3—3 of FIG. 1.

Referring now to FIGS. 1–3, a battery package constructed in accordance with the invention is shown and generally designated as 10. The battery package 10 is constructed to encapsulate and seal a thin battery 12.

AS shown in FIG. 1, the thin battery 12 is generally rectangular in shape and includes a pair of electric leads 14, 16. AS shown in FIG. 3, the battery 12 includes a lithium anode 18 connected to electrical lead 16 and a solid cathode 20 connected to electrical lead 14.

In thin batteries used for semiconductor and display technologies, lithium is often utilized to form the anode. This is because lithium has a favorable thermodynamic electrode potential and a very high specific capacity. Lithium anode batteries are also utilized to satisfy the power requirements of small electronic devices such as electric watches, cardiac pacemakers, hearing aids and devices used in military and aerospace equipment.

As a result of its electropositive nature, lithium rapidly reduces water. When exposed to humid air, a lithium surface will react rapidly with the oxygen and nitrogen present in the air. For this reason, lithium anode batteries are typically assembled in dry rooms. The lithium anode must then be hermetically sealed to prevent oxidation and corrosion during use. If the oxidation and corrosion rates of the lithium anode can be maintained at a low level by a hermetic enclosure, a thin battery such as thin battery 12 will exhibit a high shelf life.

The cathode 20 of the thin battery 12 my be formed of a solid electrolytic material such as a copper or silver oxosalt, a polycarbon fluoride, or a sulphide. The lithium anode 18 and the cathode 20 are typically assembled in electrical contact with one another utilizing suitable electrolyte impregnated separators and barrier layers (not shown). The reaction of the lithium anode 18 with the electrolytes contained in the cathode 20 provides the cell reaction or discharge mechanism for the thin battery 12.

With reference to FIG. 3, the battery package 10 for encapsulating and sealing the thin battery 12 includes a flexible polymer base film 22 formed into a structure that encloses the thin battery 12 and a flexible layer of an inorganic material 24 such as silicon nitride, aluminum nitride or aluminum oxide deposited on the surface and edges of the base film 22 to seal and encapsulate the assembly. The base film 22 is physically attached to the thin battery 12 utilizing a heat activated adhesive material 26.

A method of forming the battery package 10 in accordance with the invention includes the steps of:

attaching a flexible base film 22 to the thin battery 12 to enclose the thin battery 12 (i.e. anode 18, cathode 20); and then depositing a flexible layer of an inorganic material 24 on the surface and edges of the base film 22 to form a hermetically sealed assembly.

The base film 22 is preferably formed of one or more sheets of a flexible polymer film. As an example, two sheets of a polymer material may be shaped and overlapped to form a sandwich-like structure that covers the battery 12. The enclosed structure can then be sealed by depositing a flexible layer of inorganic material 24 over the surface of the base film 22 and the seams or edges of the enclosed structure. The battery package 10 can thus be quickly and inexpensively assembled. Moreover, the flexible layer of inorganic material 24 totally encapsulates and seals the battery 12 and also the egress of the leads 14, 16 from the battery 12. Alternately, for a package (not shown) battery the entire battery may be encapsulated by the battery package to form a leadless assembly.

The layer of inorganic material 24 may be deposited on the base film 22 utililizing a suitable deposition process such as a low temperature (i.e. less than 150° C.), low pressure, chemical vapor deposition (LPCVD) process. A glow decomposition method such as plasma CVD may also be utilized to deposit the flexible layer of inorganic material 24. Suitable sputtering techniques using suitable target compositions and reactive gases may also be employed to deposit the layer of inorganic material 24.

Silicon nitride ($Si_3N_4$) is a suitable material for forming the layer of inorganic material 24. Silicon nitride ($Si_3N_4$) is often utilized as an insulator or passivating layer in semiconductor manufacture and in the construction of transistors and other solid-state devices. Silicon nitride is characterized by low thermal conductivity, high temperature resistance, and high resistance to various corrosive media. Silicon nitride is also highly impervious to gas and moisture transmission. A low temperature method of CVD deposition of silicon nitride is disclosed in U.S. Pat. No. 4,262,631 to Kubacki which is incorporated herein by reference.

The base film 22 may be formed of a flexible polyester resin such as a polycarbonate, a glass reinforced polyester fiber or a thermosetting molding compound. Such flexible polymer films are tough, impact and temperature resistant, and electrically insulating. In general however, such polymer films have high gas (i.e. oxygen, nitrogen, hydrogen, carbon dioxide) and water vapor transmission rates. For this reason and to seal the assembly, the base film 22 is coated with the flexible layer of inorganic material 24.

Figure 4:
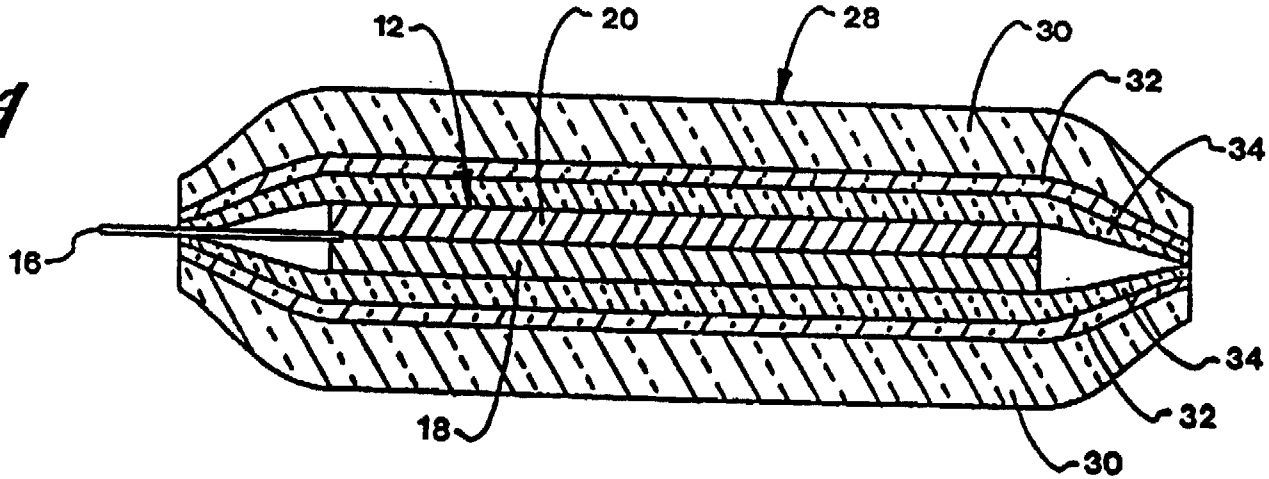
FIG. 4 is a cross sectional view equivalent to FIG. 3 but of a thin battery package constructed in accordance with an alternate embodiment of the invention.

Referring now to FIG. 4, an alternate embodiment battery package constructed in accordance with the invention is shown and generally designated as 28. The alternate embodiment battery package 28 is similar in construction to the battery package 10 previously described. With the alternate embodiment battery package 28 however, a flexible layer 32 of an inorganic material such as silicon nitride, aluminum nitride or aluminum oxide is deposited on a flexible base film 30 prior to assembly of the battery package 28. The layer 32 of inorganic material is thus located on an inside surface of tha battery package 28. As before, a heat activated adhesive 34 can be used to attach the base film 30 to the battery 12.

Thus a battery package 10 (or 28) for thin batteries can be constructed in accordance with the invention using a low cost flexible base film formed into a structure that encloses the battery. This enclosed structure can then be quickly and inexpensively hermetically sealed with a flexible deposited layer of an inorganic material such as silicon nitride, aluminum nitride or aluminum oxide. Such a base film/sealing layer composite structure will provide excellent gas and water vapor protection which is equal to, or in some applications superior to, a hermetic metal enclosure.

Other advantages of a battery package assembled in accordance with the invention include weight reduction, flexibility, reduced thickness, lower cost manufacturing, surface conformability (the battery my be attached to a curved surface) and chemical resistance. The flexible layer of inorganic material is also nonconductive and provides less metal mass than metal enclosures or foil laminated battery packaging pouches.

Although the invention has been described in terms of a preferred embodiment, it is intended that alternate embodiments of the inventive concepts expressed herein be contained within the scope of the following claims.

What is claimed is:

1. A battery package for a thin battery comprising:

a flexible polymer base film attached to and enclosing the battery; and a flexible layer of an inorganic material deposited on the base film to encapsulate and seal the battery wherein the inorganic material is selected from the group consisting of silicon nitride, aluminum nitride and aluminum oxide.

2. The battery package as claimed in claim 1 and wherein the flexible layer of inorganic material is deposited on the base film after the base film is attached to the battery.

3. The battery package as claimed in claim 1 and wherein the flexible layer of inorganic material is deposited on the base film before the base film is attached to the battery.

4. The battery package as claimed in claim 1 and wherein the flexible base film is attached to the battery using an adhesive.

5. The battery package as claimed in claim 1 and wherein the flexible layer of inorganic material is deposited using a low temperature chemical vapor deposition (CVD) process.

6. A battery package for a thin battery having a pair of electrical leads comprising:

a flexible polymer base film attached to and enclosing the battery; and flexible layer of an inorganic material selected from a group consisting of silicon nitride, aluminum nitride and aluminum oxide deposited on an external surface and edges of the base film to encapsulate and seal the battery and an egress of the electrical leads from the battery.

7. The battery package as claimed in claim 6 and wherein the base film is formed of two sheets of a polyester material overlapped to form a sandwich-like structure.

8. The battery package as claimed in claim 7 and wherein the base film is attached to the battery with a heat activated adhesive.

9. The battery package as claimed in claim 8 and wherein the layer of inorganic material is deposited on the base film before it is attached to the battery.

10. The battery package as claimed in claim 8 and wherein the layer of inorganic material is deposited on the base film after it is attached to the battery.

11. The battery package as claimed in claim 8 and wherein the layer of inorganic material is deposited on the base film using a low temperature chemical vapor deposition (CVD) process.

12. The battery package as claimed in claim 8 and wherein the battery has a curved surface and the battery package conforms to the curved surface.

13. A battery package for a thin battery comprising:

a flexible polymer base film attached to and enclosing the battery; and a flexible film layer formed of a material selected from the group of materials consisting of silicon nitride, aluminum nitride and aluminum oxide deposited on the base film using a chemical vapor deposition (CVD) process to encapsulate and seal the battery.

14. The battery package as claimed in claim 13 and wherein the flexible film layer encapsulates an egress of electrical leads extending from the battery.

15. The battery package as claimed in claim 13 and wherein the CVD process is a low temperature process and the flexible film layer is silicon nitride.

16. The battery package as claimed in claim 13 and wherein the base film is attached to the battery using an adhesive.

17. The battery package as claimed in claim 16 and wherein the adhesive is heat activated.

18. The battery package as claimed in claim 13 and wherein the battery includes a cathode and an anode assembled in electrical contact with one another.

19. The battery package as claimed in claim 18 and wherein the base film is attached to the anode and to the cathode.

20. The battery package as claimed in claim 13 and wherein the battery includes an anode connected to a first lead extending out of the flexible film layer and a cathode connected to a second lead extending out of the flexible film layer.

*21. A package for a battery comprising:*

*a flexible polymer base film attached to and enclosing the battery; and*

*a flexible layer of an inorganic material deposited on the base film to encapsulate and seal the battery wherein the inorganic material is selected from the group consisting of silicon nitride, aluminum nitride and aluminum oxide.*

*22. The battery package as claimed in claim 21 and wherein the flexible layer of inorganic material is deposited on the base film after the base film is attached to the battery.*

*23. The battery package as claimed in claim 21 and wherein the flexible layer of inorganic material is deposited on the base film before the base film is attached to the battery.*

*24. The battery package as claimed in claim 21 and wherein the flexible base film is attached to the battery using an adhesive.*

*25. The battery package as claimed in claim 21 and wherein the flexible layer of inorganic material is deposited using a low temperature chemical vapor deposition (CVD) process.*

*26. A package for a battery having a pair of electrical leads comprising:*

*a flexible polymer base film attached to and enclosing the battery; and*

*a flexible layer of an inorganic material selected from the group consisting of silicon nitride, aluminum nitride and aluminum oxide deposited on an external surface and edges of the base film to encapsulate and seal the battery and an egress of the electrical leads from the battery.*

*27. The battery package as claimed in claim 26 and wherein the base film is formed of two sheets of a polyester material overlapped to form a sandwich-like structure.*

*28. The battery package as claimed in claim 27 and wherein the base film is attached to the battery with a heat activated adhesive.*

*29. The battery package as claimed in claim 28 and wherein the layer of inorganic material is deposited on the base film before it is attached to the battery.*

*30. The battery package as claimed in claim 28 and wherein the layer of inorganic material is deposited on the base film after it is attached to the battery.*

*31. The battery package as claimed in claim 28 and wherein the layer of inorganic material is deposited on the base film using a low temperature chemical vapor deposition (CVD) process.*

*32. The battery package as claimed in claim 28 and wherein the battery has a curved surface and the battery package conforms to the curved surface.*

*33. A package for a battery comprising:*

*a flexible polymer base film attached to and enclosing the battery; and*

*a flexible film layer formed of a material selected from the group of materials consisting of silicon nitride, aluminum nitride and aluminum oxide deposited on the base film using a chemical vapor deposition (CVD) process to encapsulate and seal the battery.*

*34. The battery package as claimed in claim 33 and wherein the flexible film layer encapsulates an egress of electrical leads extending from the battery.*

*35. The battery package as claimed in claim 33 and wherein the CVD process is a low temperature process and the flexible film layer is silicon nitride.*

*36. The battery package as claimed in claim 33 and wherein the base film is attached to the battery using an adhesive.*

*37. The battery package as claimed in claim 36 and wherein the adhesive is heat activated.*

*38. The battery package as claimed in claim 33 and wherein the battery includes a cathode and an anode assembled in electrical contact with one another.*

*39. The battery package as claimed in claim 38 and wherein the base film is attached to the anode and to the cathode.*

*40. The battery package as claimed in claim 33 and wherein the battery includes an anode connected to a first lead extending out of the flexible film layer and a cathode connected to a second lead extending out of the flexible film layer.*

* * * * *